Nov. 9, 1954 R. E. COLEMAN, JR., ET AL 2,693,734
OPTICAL SYSTEM FOR CARD TRANSLATORS
Filed Aug. 25, 1950
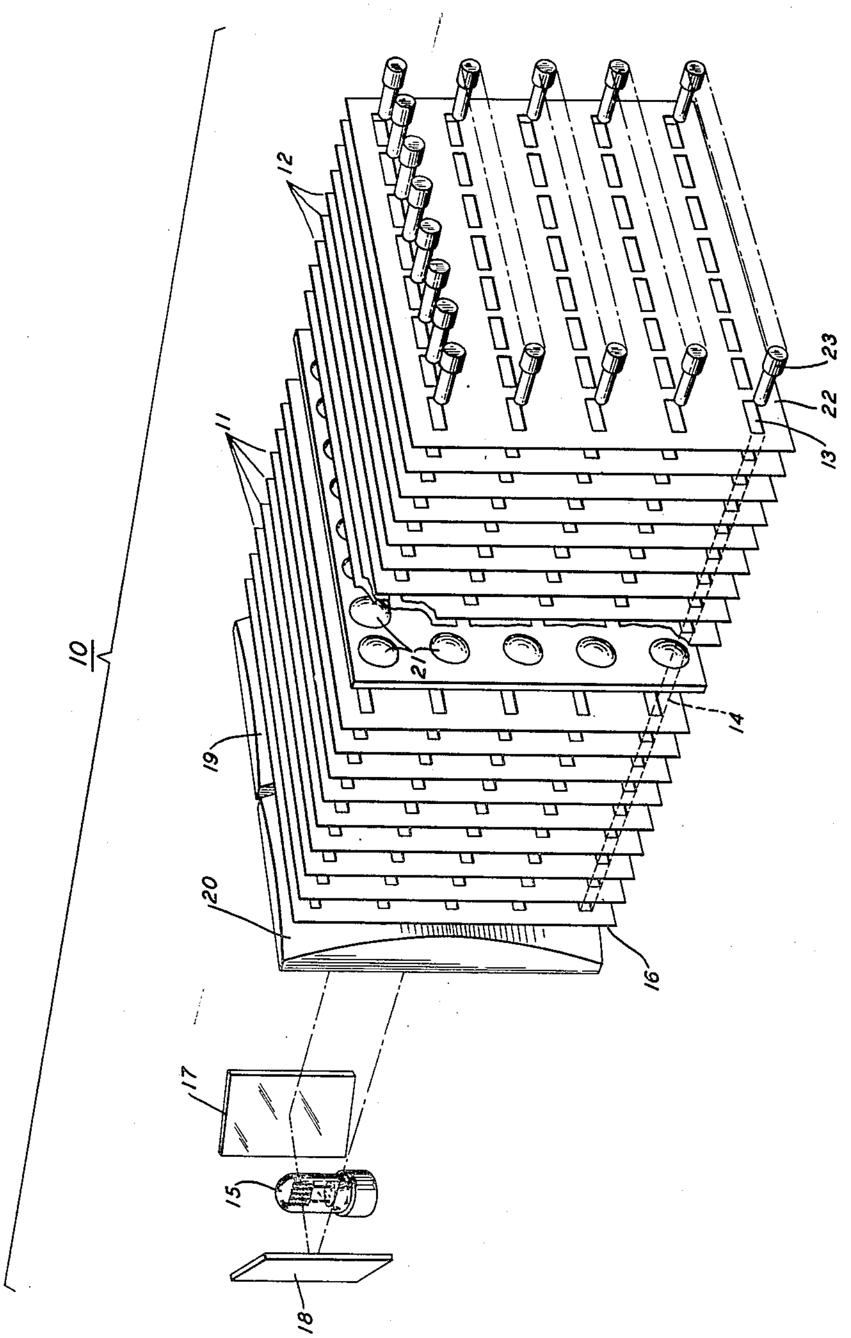
INVENTORS. R. E. COLEMAN, JR.
E. F. KINGSBURY
BY Hugh S. Wertz
ATTORNEY

United States Patent Office 2,693,734

Patented Nov. 9, 1954

2,693,734

OPTICAL SYSTEM FOR CARD TRANSLATORS

Robert E. Coleman, Jr., West Englewood, and Edwin F. Kingsbury, Rutherford, N. J., assignors to Bell Telephone Laboratories, Incorporated, New York, N. Y., a corporation of New York

Application August 25, 1950, Serial No. 181,338

2 Claims. (Cl. 88—1)

This invention relates to optical systems and, more particularly to an optical system for card translators, such as, for example, those of the kind described in the copending joint application of E. W. Gent and O. Myers, Serial No. 784,024, filed November 4, 1947, which is now U. S. Patent No. 2,668,877, granted February 9, 1954.

Card translators can be employed in telephone practice to effect interconnection between different automatic telephone systems or between two automatic telephone exchanges employing different combinations of code groups and for many other diverse operations in automatic telephone offices. As more automatic telephone dial exchanges are interconnected in an expanding network, the necessity for rapid and reliable transfer from one signal code to another becomes increasingly important. The use of electromechanical card translators offers a practical solution to this need in that such changes can be accomplished merely by removing one card from the translator and replacing it with another card having differently coded perforations.

A card translator essentially is made up of an input register to receive and utilize the input information, a card stack including a plurality of cards, each of which is perforated in accordance with signal code and from which one card is selected by means of the input register for displacement in the card stack, and an output circuit for deriving output information from the displaced card.

The method of operation of such a device essentially comprises three steps as follows: first, transforming the input information for the selection of a single card; second, operating upon the selected individual card to move it; and, third, deriving circuit information from the displaced card output.

In operation, in the normal position before displacement, the perforated cards are stacked so that the card perforations are in alignment and form a plurality of channels which extend the length of the stack. Then after displacement of the selected card, some of these channels are blocked by opaque portions of the displaced card in a pattern which corresponds to the coded perforations of the displaced card. For the derivation of output information, radiant energy from a light source at the front end of the card stack is passed through the light channels formed by the apertures in the stacked cards. This light penetrates the stack completely only through those channels which have not been blocked by the opaque portions of the displaced card. At the opposite end of the stack, the light transmitted falls on photosensitive output cells in an illuminated pattern determined by the pattern of the coded perforations in the displaced card and there are derived electrical impulses representing the output information. For a more complete discussion of the principles of card translators, reference is made to the above-mentioned patent of E. W. Gent and O. Myers.

The object of this present invention is to improve the optical system in such a card translator in order to increase the compactness thereof and increase and facilitate the efficient transmission of light through the card stack channels.

The problem of transmitting sufficient light through the light channels has been an important one in these devices. For a compact structure, it is important to limit the size of the cards which make up the stacks and, as incident thereto, the dimensions of the apertures in the cards, which apertures form the light channels therethrough. Since, in operation, it is often desirable to utilize at least a thousand of such apertured cards in a card stack, there usually results a light path of considerable length relative to the small cross-sectional dimensions desired for the light channels. In practice, it is found that one of the important factors limiting the restriction in size of card translators is the need for card apertures of such size to insure sufficient light transmission therethrough when aligned in such a card stack. Moreover, the importance of long lamp life imposes maximum limitations on the intensity of the primary light source. Therefore, it is important that the optical system employed for transmitting the light through the light channels of the card stack be of the optimum possible efficiency to permit the maximum diminution of the dimensions of the card apertures consistent with adequate illumination necessary for reliable operation. Moreover, it will be evident that it is advantageous to utilize a minimum of light sources in order to reduce maintenance problems, to facilitate adjustment and assembly, and to increase the uninterrupted operating life of the system. For these reasons, it is desirable to provide a single source for a plurality of such light channels.

Accordingly, the present invention provides a highly efficient optical system for transmitting light energy from a single source through a plurality of channels formed by the stack of apertured cards.

In accordance with one feature of the invention, there is provided a mirror system for substantially doubling the efficiency of the lamp source, permitting economy in power consumption and simplicity in ventilation, and at the same time adding compactness to the structure by increasing the length of optical path from the light source without a corresponding increase in the length of the card translator.

Also another feature which increases the efficiency of the system is a plane filament light source of configuration similar to that of the light channels formed by the card apertures, which source is employed in a manner permitting almost complete utilization of the radiated light energy.

These features are incorporated in one exemplary embodiment in accordance with the invention in which: a plane filament light source is positioned opposite the front face of the card stack in a plane perpendicular thereto; light therefrom is directed to mirrors positioned on each side thereof to be reflected therefrom through collimating lenses associated therewith for forming light beams, illuminating and perpendicular to the front face of the card stack, for transmission through the light channels formed by the apertured card stacks; interposed in the card stack is an array of spherical lenses, one in alignment with each channel for redirecting whatever scattering has occurred and for focusing an image of the filament source at substantially the opposite end of the stack; and at the opposite end of the card stack, an array of photosensitive means such as phototransistors, for example, one for each channel, utilizes the transmitted light energy to actuate the output circuit in accordance with the input information.

The invention will be better understood by reference to the following more detailed description taken in connection with the accompanying drawing which shows, in perspective, an exemplary embodiment thereof. However, it is to be understood that this embodiment is merely illustrative of the principles of the invention. Other arrangements are possible without departing from the spirit and scope of the invention.

With reference to the drawing there is illustrated an arrangement 10 which forms part of a card translator. Therein, the card stack 11 comprises a plurality of cards 12 each having a plurality of apertures 13. The cards are so apertured that when properly arranged in the card stack, the apertures form a plurality of light channels 14 which penetrate the card stack. For purposes of illustration, the card apertures have been drawn to an expanded scale and are shown more widely separated than is usually the case in practice. A light source 15 is positioned opposite the front face of the card stack. In accordance with one feature of the invention, this source preferably comprises a plane, or two-dimensional filament, whereby an important part of the light energy is radiated normal to this filament plane. This source is positioned in a plane perpendicular to the front face 16 of the card stack, opposite the vertical midline thereof. It is also desirable that a projection of the filament source on a plane perpendicular to this front face be substantially similar to the configuration of the light channels 14. It will be appreciated that in this way maximum utilization of the light source and of the cross-sectional area of the light channel can be realized. Since it is desirable to utilize rectangular cross-sectional light channels, the source preferably should be of like configuration. Such a source can be had using a filament comprising several coils in a closely wound parallel arrangement in rectangular form. A lamp which has a General Electric C13D type filament is such a source. Two first-surface mirrors 17 and 18 are used on opposite sides of the light source 15 to be illuminated thereby. Each mirror is preferably inclined at an angle of approximately 45 degrees with respect to both the front face 16 of the card stack and the plane of the source 15 for reflecting the incident radiation from the light source towards the front face of the card stack. Interposed between the mirrors and the front face of the card stack, are positioned the plano-convex lenses 19 and 20 for collimating the light beams reflected from the mirrors 17 and 18, respectively, and cooperating therewith to provide light beams illuminating and perpendicular to the front face of the card stack for transmission through the card apertures. It will be evident that it may be possible in some cases to improve the uniformity of the desired illumination by the use of additional inclined mirrors and associated collimating lens in this manner. By such an arrangement, there can be assured substantially uniform illumination normal to the front face of the card stack, important for the penetration of the card stack with a minimum of aberration losses. Moreover by the use of a plane filament positioned in this way, maximum possible radiation from the source is utilized for this illumination, making possible the maximum efficiency of the light source. It can be appreciated that the use of two mirrors in this way provides geometrically two images of the source whereby there is obtained the equivalent of two sources. As an additional advantage, by the use of reflecting mirrors in this way, compactness of structure is achieved by realizing the necessary optical path between the source and the collimating lenses with a minimum of length in the over-all dimensions of the card translator. Therefore, this arrangement in addition to maximizing the efficiency of the light source, results in more uniform illumination and a more compact structure.

Substantially mid-way through the card stack there is interposed an array of plano-convex field lenses 21, one for each light channel, to reduce the scattering of the light beam in the light channels which tends to produce aberration losses and to produce an image of the light source approximately at the exit end 22 of the card stack for use by the photosensitive output means. In practice, it has been found preferable to have this image focused short of the exit aperture, so that, at the exit aperture, there is some divergence and a more uniform field. To this end, the focal lengths of the collimating lenses 19 and 20 and the field lenses 21 and the optical path from the lenses 19 and 20 to the primary source 15 are adjusted to provide an image of the source filament approximately at the exit aperture of the card stack. At the exit end of the card stack are positioned an array of photosensitive means 23. For example, such means can comprise for each channel a lens for focusing the source image to a point for utilization by a phototransistor of the kind described in an article entitled "The Phototransistor" by J. N. Shive in the Bell Laboratories Record for August 1950, for converting the incident radiation into an electrical impulse for use in the output circuit.

One illustrative embodiment was constructed in accordance with the invention as follows: the card stack comprised 1000 apertured cards; each of the light channels formed by the apertures in the cards had a cross section 3/8 inch x 1/10 inch and a length of 12¾ inches; the collimating lens adjacent the front face of the card stacks was plano-convex with a focal length of 9½ inches; each of the field lenses interposed mid-way through the card stack was plano-convex with a focal length of 4 inches; and the light source was positioned to provide an optical path from the source filament to the collimating lens of 8¾ inches.

Ordinarily with electronic circuits, it is preferable for utilization purposes to derive an alternating current output. For this reason, it is usually desirable in card translators to use intermittent light for transmission through the card stack for conversion by the photosensitive means. Such intermittent light can be conveniently obtained in the arrangement described by interposing rotating means in the optical path for periodically interrupting the light beams to produce an alternating output. For example, such rotating means may be interposed between the light source 15 and each of the reflecting mirrors 17 and 18. Such positioning permits the interrupting or chopping before appreciable dispersion of the light whereby the process is simplified.

A different type of optical system for a card translator is disclosed in a copending application of E. F. Kingsbury. Serial No. 181,337, filed August 25, 1950.

What is claimed is:

1. An optical system, adapted for use in a card translator having a plurality of multi-apertured substantially rectangular cards arranged in a card stack with the apertures thereof forming light channels through the card stack, comprising a single, extended, substantially plane light source having a configuration similar to that of the light channels positioned opposite and perpendicular to the front face of the card stack, a pair of plane mirror means inclined with respect to the front face of the card stack and arranged with one means on each side of the light source, for reflecting light therefrom onto the front face of the card stack, two large collimating lenses mounted between said mirror means and said card stack forming light into beams perpendicular to and illuminating the greater portion of the front face of the card stack, the principal focal plane of both of said collimating lenses being substantially coincident with the plane of said light source, and an array of field lenses interposed in said card stack, one in alignment with each light channel, cooperating with said collimating lenses and having their focal planes approximately at the opposite end of the card stack, for forming images of the light source substantially at said opposite end.

2. An optical system, adapted for use in a card translator having a plurality of multi-apertured substantially rectangular cards arranged in a card stack with the apertures thereof forming light channels through the card stack, comprising a single, extended, substantially plane light source having a configuration similar to that of the light channels positioned opposite and perpendicular to the front face of the card stack, a pair of plane mirror means inclined with respect to the front face of the card stack and arranged with one means on each side of the light source, for reflecting light therefrom onto the front face of the card stack, two large collimating lenses mounted between said mirror means and said card stack forming light into beams perpendicular to and illuminating the greater portion of the front face of the card stack, the principal focal plane of both of said collimating lenses being substantially coincident with the plane of said light source, an array of field lenses interposed in said card stack, one in alignment with each light channel, cooperating with said collimating lenses and having their focal planes approximately at the opposite end of the card stack, for forming images of the light source substantially at said opposite end, and individual means for receiving light aligned with each of the light channels and located at said opposite end of the card stack.

References Cited in the file of this patent

UNITED STATES PATENTS

| Number | Name | Date |
|---|---|---|
| 1,213,974 | Taylor | Jan. 30, 1917 |
| 1,657,270 | Muller et al. | Jan. 24, 1928 |
| 1,935,471 | Kanolt | Nov. 14, 1933 |
| 1,977,359 | Styer | Oct. 16, 1934 |
| 2,034,436 | Highstone | Mar. 17, 1936 |
| 2,052,844 | Prusso et al. | Sept. 1, 1936 |
| 2,152,645 | Holven et al. | Apr. 4, 1939 |
| 2,438,825 | Roth | Mar. 30, 1948 |
| 2,482,242 | Brustman | Sept. 20, 1949 |
| 2,482,420 | Keuper | Sept. 20, 1949 |
| 2,505,069 | Savino | Apr. 25, 1950 |
| 2,515,862 | Carlton et al. | July 18, 1950 |
| 2,519,688 | Mitchell | Aug. 22, 1950 |
| 2,573,405 | Clark | Oct. 30, 1951 |